(12) United States Patent
Jeong et al.

(10) Patent No.: US 7,991,051 B2
(45) Date of Patent: Aug. 2, 2011

(54) INTERFRAME WAVELET CODING APPARATUS AND METHOD CAPABLE OF ADJUSTING COMPUTATIONAL COMPLEXITY

(75) Inventors: Se-Yoon Jeong, Daejon (KR); Kyu-Heon Kim, Daejon (KR); Wonha Kim, Gyeonggi-do (KR); Jin-Woong Kim, Daejon (KR)

(73) Assignees: Electronics and Telecommunications Research Institute, Daejon (KR); Industry Academic Cooperation Foundation of Kyunghee University, Gyeonggi-do (KR)

( * ) Notice: Subject to any disclaimer, the term of this patent is extended or adjusted under 35 U.S.C. 154(b) by 1447 days.

(21) Appl. No.: 10/580,103

(22) PCT Filed: May 13, 2004

(86) PCT No.: PCT/KR2004/001130
§ 371 (c)(1),
(2), (4) Date: May 19, 2006

(87) PCT Pub. No.: WO2005/051000
PCT Pub. Date: Jun. 2, 2005

(65) Prior Publication Data
US 2007/0081593 A1    Apr. 12, 2007

(30) Foreign Application Priority Data

Nov. 21, 2003  (KR) .................. 10-2003-0083015
Mar. 2, 2004   (KR) .................. 10-2004-0014032

(51) Int. Cl.
*H04N 7/12* (2006.01)
(52) U.S. Cl. .................................. 375/240.19
(58) Field of Classification Search . 375/240.01–240.29
See application file for complete search history.

(56) References Cited

U.S. PATENT DOCUMENTS
5,838,377 A * 11/1998 Greene .................... 375/240.11
(Continued)

FOREIGN PATENT DOCUMENTS
JP         09-182071 A      7/1997
(Continued)

OTHER PUBLICATIONS

'Motion-Compensated 3-D Subband Coding of Video' Choi et al., IEEE Transactions on Image Processing, vol. 8, No. 2, Feb. 1999, pp. 155-167.
'Video Coding for Digital Cinema' Chen et al., Center for Next Generation Video, Rensselaer Polytechnic Institute, 2002 IEEE, Supplied by the British Library —"The world's knowledge" www.bl.uk, pp. 749-752.

(Continued)

*Primary Examiner* — David Czekaj
(74) *Attorney, Agent, or Firm* — Ladas & Parry LLP

(57) ABSTRACT

Provided is an inter-frame wavelet coding apparatus that can reduce the computation complexity of a decoder by adjusting a decomposition level and a filter length based on the information amount of a frame during wavelet transform and a method therefor. The inter-frame wavelet coding apparatus includes: a Motion Compensated Temporal Filtering (MCTF) unit for computing a motion vectors of a group of pictures (GOP) and filtering the GOP with respect to the temporal axis, to thereby obtain filtered frame; a wavelet transforming unit for performing spatial wavelet transform on the filtered frame and outputting a wavelet coefficient; a quantization unit for quantizing the wavelet coefficient; an entropy coding unit for entropy-coding the motion vector computed in the MCTF unit and the quantized wavelet coefficient, to thereby generate an entropy-coded bit stream; and a wavelet filter managing unit for selecting a decomposition level and a filter length for the wavelet transforming unit based on motion estimation information of the GOP video computed in the MCTF unit, wherein the decomposition level and the filter length are included in the entropy-coded bit stream.

18 Claims, 5 Drawing Sheets

U.S. PATENT DOCUMENTS

| | | | |
|---|---|---|---|
| 6,141,446 A * | 10/2000 | Boliek et al. | 382/233 |
| 6,466,698 B1 | 10/2002 | Creusere | |
| 6,978,048 B1 * | 12/2005 | Higginbottom et al. | 382/240 |
| 7,023,923 B2 * | 4/2006 | Turaga et al. | 375/240.19 |
| 7,042,946 B2 * | 5/2006 | Turaga et al. | 375/240.19 |

FOREIGN PATENT DOCUMENTS

| | | |
|---|---|---|
| JP | 2001-025018 A | 1/2001 |
| JP | 2001-258033 A | 9/2001 |
| KR | 1020000018752 A | 4/2000 |

OTHER PUBLICATIONS

'A Resolution and Frame-Rate Scalable Subband/Wavelet Video Coder' Woods et al., IEEE Transactions on Circuits and Systems for Video Technology, vol. 11, No. 9, Sep. 2001, pp. 1035-1044.

'A Fully Scalable 3D Subband Video Coder' Bottreau et al., 2001 IEEE, Supplied by the British Library —"The world's knowledge" www.bl.uk, pp. 1017-1020.

* cited by examiner

INTERFRAME WAVELET CODING APPARATUS AND METHOD CAPABLE OF ADJUSTING COMPUTATIONAL COMPLEXITY

TECHNICAL FIELD

The present invention relates to a video coding apparatus and method; and more particularly to an inter-frame wavelet coding apparatus and method that can adjust computational complexity of a decoding apparatus by controlling a decomposition level and a filter length during wavelet transform.

BACKGROUND ART

With excellent compression rate and fine scalability, an inter-frame wavelet coding method is generally appropriate for diverse application apparatuses that require a function of scalability. The video scalability is a core function that secures quality of service (QoS) in a heterogeneous network environment such as a network integrating broadcasting and communication.

Since a conventional video coding method based on DCT (DCT) is optimized for supporting a single scalability function, it is not suitable to a service requiring a multiple scalability function such as a heterogeneous network environment.

Inter-frame wavelet coding is also called three-dimensional (3D) sub-band coding.

This is because two-dimensional video wavelet transform is performed on video which is obtained by performing sub-band filtering with respect to the temporal axis.

When filtering is performed with respect to the temporal axis, the filtering is not a simple filtering but it is performed in consideration of the motion of video. This filtering is referred to as Motion Compensated Temporal filtering (MCTF).

The inter-frame wavelet coding begins with performing MCTF on video inputted on a basis of group of picture (GOP).

MCTF includes two methods: One is a method of filtering a plurality of frames with respect to the temporal axis, and the other is a method of filtering two frames with respect to the temporal axis. According to the method of filtering a plurality of frames with respect to the temporal axis, original frames are set as reference frames and highpass-filtered frames are generated based on the reference frames and their neighboring frames.

According to the method of filtering two frames with respect to the temporal axis, lowpass-filtered and highpass-filtered frames are generated with reference to the two neighboring frames.

Here, a motion vector for each block is calculated with respect to input video prior to being filtered and the calculated motion vector is applied to filtering.

The methods for applying the motion vector to MCTF include an Ohm method and a Woods method. Generally, the Woods method is known and used for higher efficiency in calculating a motion vector.

Meanwhile, a Haar filter is widely used. The Haar filter performs lowpass-filtering and highpass-filtering by regarding two neighboring frames as one unit.

FIG. 1 is a diagram illustrating a motion compensated temporal filtering (MCTF) process using the Haar filter. For convenience in description, it is assumed that the GOP is 8 in the MCTF process of FIG. 1.

As shown, when MCTF is performed on the two neighboring frames, four t-L frames which are lowpass-filtered on the temporal axis and four t-H frames 111, 112, 113 and 114 which are highpass-filtered on the temporal axis are generated. The eight frames are called a first temporal level 110.

When the MCTF is performed again on the four t-L lowpass-filtered frames, two t-LL lowpass-filtered frames and two t-LH highpass-filtered frames 121 and 122 are generated. The four frames are called a second temporal level 120.

If the MCTF is performed again on the two t-LL lowpass-filtered frames, a t-LLL frame 131 and a t-LLH frame 132 are generated. The two frames 131 and 132 are called a third temporal level 130.

The eight frames 111, 112, 113, 114, 121, 122, 131 and 132 on which the MCTF is performed go through spatial wavelet transform, quantization and entropy coding and eventually, bit stream is generated and transmitted to a receiving end.

Conventionally, a 9/7 filter or a 5/3 filter is used uniformly in a step of spatial wavelet transform, regardless of characteristics of a frame.

If the wavelet transform is carried out using all the same filters regardless of characteristics of a frame, there is a problem that the amount of calculation is increased unnecessarily during inverse wavelet transform of decoding. The amount of calculation required for the inverse wavelet transform is increased as the number of decomposition levels of wavelet transform is larger and the length of a filter is longer.

If the calculation amount of the inverse wavelet transform is increased the inter-frame wavelet coding method cannot be used in a terminal having low computing capability such as a Personal Digital Assistant (PDA).

DISCLOSURE OF INVENTION

Technical Solution

It is, therefore, an object of the present invention to provide an inter-frame wavelet coding apparatus that can reduce computational complexity of a decoding apparatus by adjusting a decomposition level and the length of a filter based on the amount of frame information during wavelet transform, and a method therefor.

It is another object of the present invention to provide an inter-frame wavelet coding apparatus that can perform decoding in a terminal having low computing capability by reducing an inverse wavelet and computational complexity, and a method therefor.

In accordance with one aspect of the present invention, there is provided an inter-frame wavelet coding apparatus, including: a Motion Compensated Temporal filtering (MCTF) unit for computing a motion vectors of a group of pictures (GOP) and filtering the GOP with respect to the temporal axis, to thereby obtain filtered frame; a wavelet transforming unit for performing spatial wavelet transform on the filtered frame and outputting a wavelet coefficient; a quantization unit for quantizing the wavelet coefficient; an entropy coding unit for entropy-coding the motion vector computed in the MCTF unit and the quantized wavelet coefficient, to thereby generate an entropy-coded bit stream; and a wavelet filter managing unit for selecting a de-composition level and a filter length for the wavelet transforming unit based on motion estimation information of the GOP video computed in the MCTF unit, wherein the de-composition level and the filter length are included in the entropy-coded bit stream.

In accordance with another aspect of the present invention, there is provided an inter-frame wavelet coding apparatus, including: an MCTF unit for computing motion vectors of performing a group of pictures (GOP) and lowpass filtering and highpass filtering the GOP with respect to the temporal axis and performing lowpass filtering and highpass filtering on a lowpass-filtered frame repeatedly; a first wavelet transformer having a maximum decomposition level and a maximum filter length, for wavelet-transforming a final lowpass-filtered frame; a second wavelet transformer having a decomposition level and a filter length equal to or smaller than the de-composition level and the filter length of the first wavelet transformer, for wavelet-transforming the rest highpass-filtered GOP frames; a quantization unit for quantizing wavelet coefficients outputted from the first and second wavelet transformer; and an entropy coding unit for entropy-coding the motion vector computed in the MCTF unit and the wavelet coefficient quantized in the quantization unit.

In accordance with another aspect of the present invention, there is provided an inter-frame wavelet video decoding apparatus, including: an entropy decoding unit for entropy-decoding bit stream including information on a decomposition level and a filter length for inverse wavelet transform; an inverse quantization unit for inverse quantizing a quantized wavelet coefficient which is outputted from the entropy decoding unit; an inverse wavelet transforming unit for performing wavelet transform on the wavelet coefficient outputted from the inverse quantization unit based on the decomposition level and the filter length; and a Motion Compensated Temporal Filtering (MCTF) combining unit for performing MCTF combination on a motion vector of the entropy decoding unit.

In accordance with another aspect of the present invention, there is provided an inter-frame wavelet coding method including the steps of: a) filtering an inputted group of pictures (GOP) video with respect to the temporal axis, to thereby obtain filtered frames; b) performing spatial wavelet transform on the filtered frame; c) quantizing a wavelet coefficient generated during the wavelet transform of the step b); d) performing entropy-encoding on a motion vector computed in the MCTF process of the step a) and the wavelet coefficient quantized in the quantization process of the step c), to thereby generate an entropy-coded bit stream; e) selecting a decomposition level and a filter length for the wavelet transform based on motion estimation information of the GOP computed in the MCTF process of the step a); and f) including information on the decomposition level and the filter length in the entropy-coded bit stream.

In accordance with another aspect of the present invention, there is provided an inter-frame wavelet decoding method including the steps of: a) performing entropy-decoding on bit stream including information on a decomposition level and a filter length for inverse wavelet transform; b) inverse-quantizing a quantized wavelet co-efficient generated in the step a); c) performing inverse wavelet transform on a wavelet coefficient generated in the step b) based on the information on the decomposition level and the filter length; and d) performing a Motion Compensated Temporal Filtering (MCTF) combination based on a motion vector obtained in the step a).

DESCRIPTION OF DRAWINGS

The above and other objects and features of the present invention will become apparent from the following description of the preferred embodiments given in conjunction with the accompanying drawings, in which.

MODE FOR INVENTION

Figure 1:
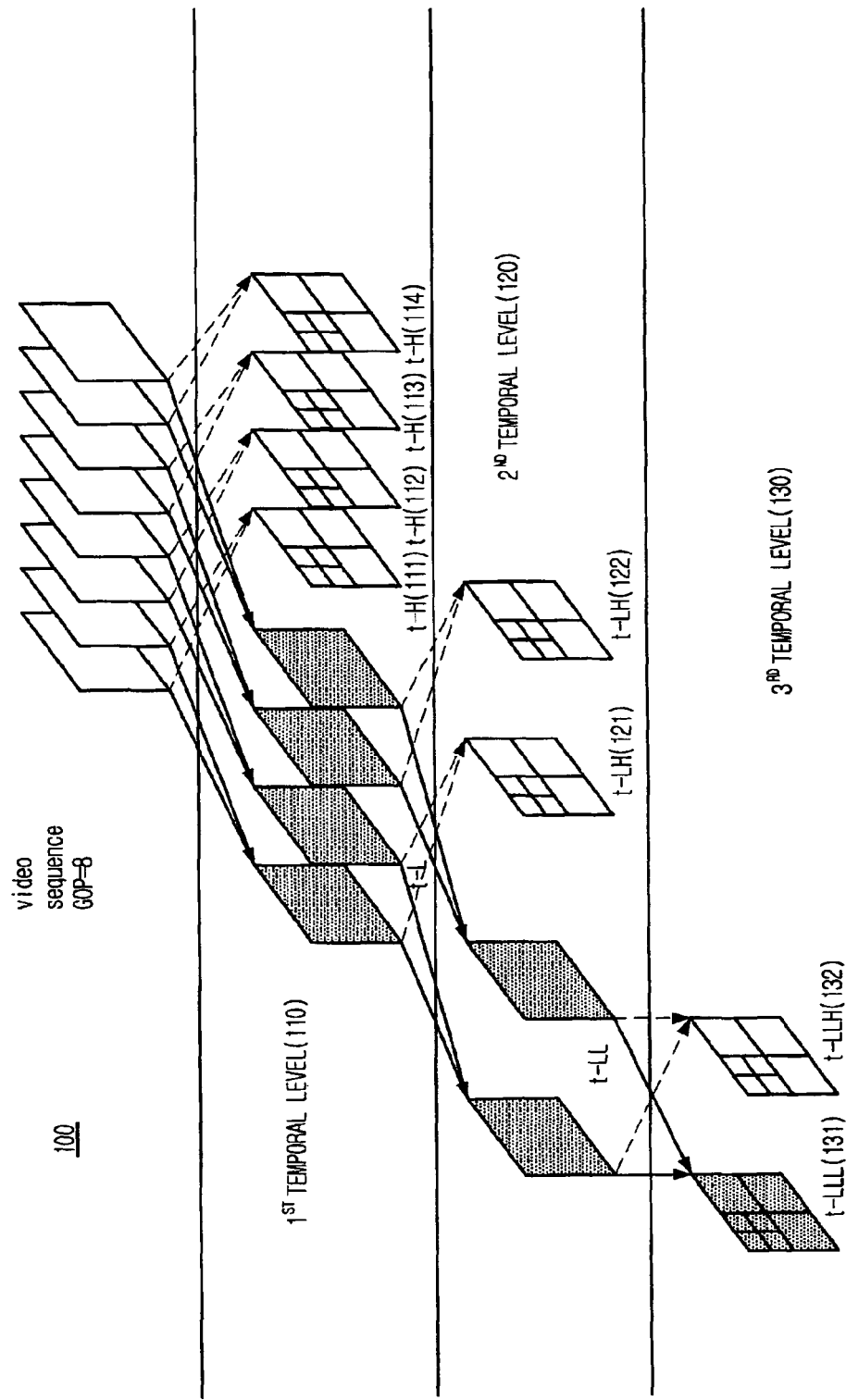
FIG. 1 is a diagram illustrating a motion compensated temporal filtering (MCTF) process.

Other objects and aspects of the invention will become apparent from the following description of the embodiments with reference to the accompanying drawings, which is set forth hereinafter.

Following description exemplifies only the principles of the present invention. Even if they are not described or illustrated clearly in the present specification, one of ordinary skill in the art can embody the principles of the present invention and invent various apparatuses within the concept and scope of the present invention.

The use of the conditional terms and embodiments presented in the present specification are intended only to make the concept of the present invention understood and they are not limited to the embodiments and conditions mentioned in the specification.

In addition, all the detailed description on the principles, viewpoints and embodiments and particular embodiments of the present invention should be understood to include structural and functional equivalents to them. The equivalents include not only currently known equivalents but also those to be developed in future, that is, all devices invented to perform the same function, regardless of their structures.

For example, block diagrams of the present invention should be understood to show a conceptual viewpoint of an exemplary circuit that embodies the principles of the present invention. Similarly, all the flowcharts, state conversion diagrams, pseudo codes and the like can be expressed substantially in a computer-readable media, and whether or not a computer or a processor is described distinctively, they should be understood to express various processes operated by a computer or a processor.

Functions of various devices illustrated in the drawings including a functional block expressed as a processor or a similar concept can be provided not only by using hardware dedicated to the functions, but also by using hardware capable of running proper software for the functions. When a function is provided by a processor, the function may be provided by a single dedicated processor, single shared processor, or a plurality of individual processors, part of which can be shared.

The apparent use of a term, 'processor', 'control' or similar concept, should not be understood to exclusively refer to a piece of hardware capable of running software, but should be understood to include a digital signal processor (DSP), hardware, and ROM, RAM and non-volatile memory for storing software, implicatively. Other known and commonly used hardware may be included therein, too.

In the claims of the present specification, an element expressed as a means for performing a function described in the detailed description is intended to include all methods for performing the function including all formats of software, such as corn binations of circuits for performing the intended function, firmware/microcode and the like.

To perform the intended function, the element is cooperated with a proper circuit for performing the software. The present invention defined by claims includes diverse means for performing particular functions, and the means are connected with each other in a method requested in the claims.

Therefore, any means that can provide the function should be understood to be an equivalent to what is figured out from the present specification.

Other objects and aspects of the invention will become apparent from the following description of the embodiments with reference to the accompanying drawings, which is set forth hereinafter. The same reference numeral is given to the same element, although the element appears in different drawings. In addition, if further detailed description on the related prior arts is determined to blur the point of the present invention, the description is omitted. Hereafter, preferred embodiments of the present invention will be described in detail with reference to the drawings.

Figure 2:
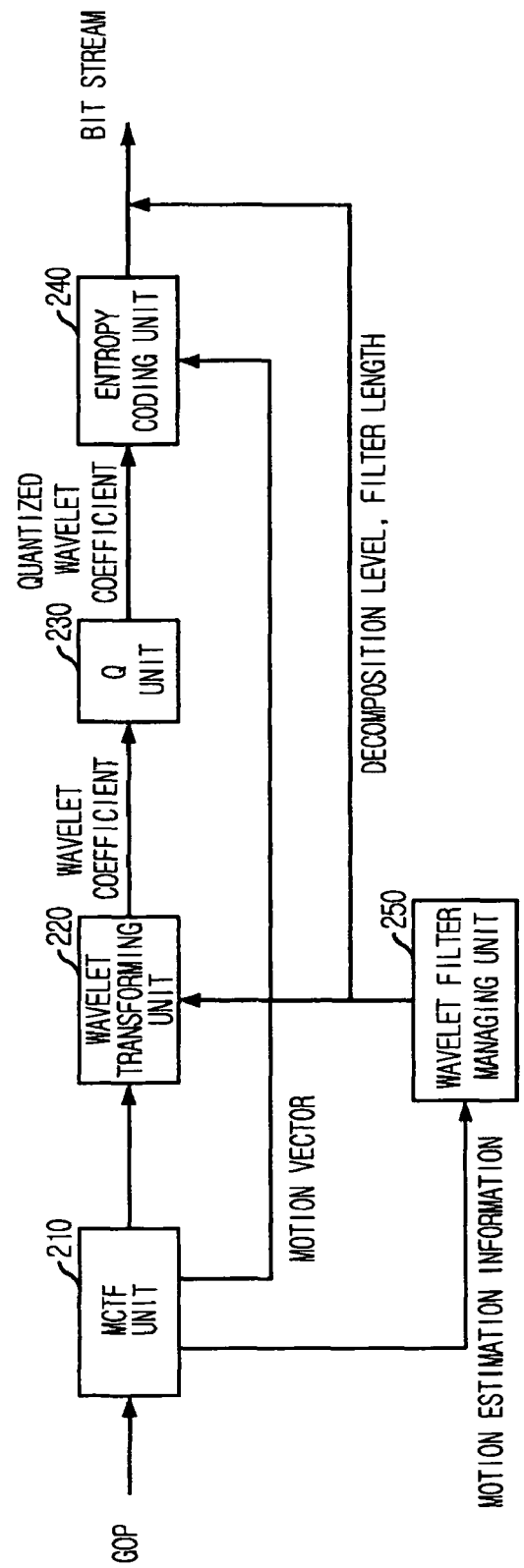
FIG. 2 is a block diagram showing a video coding apparatus in accordance with the present invention.

FIG. 2 is a block diagram showing a video coding apparatus in accordance with the present invention. A conventional inter-frame wavelet coding method requires a great deal of computation to perform an inverse wavelet wavelet transform in the course of decoding process. A decoding apparatus can be operated in a variety of terminals having a different computing capability such as Personal Digital Assistants (PDA), laptops, personal computers (PC), and settop boxes.

Accordingly, when a video signal is coded in consideration of the computing capability of a terminal, a service optimized for the terminal can be provided. For this, the present invention provides a coding method that can adjust the amount of computation in the inverse wavelet transform, a procedure that occupies a large computation amount during the decoding process. That is, wavelet transform is carried out based on decomposition levels and the length of a filter that are differentiated according to the characteristics of frames that have gone through MCTF.

Referring to FIG. 2, the video coding apparatus of the present invention includes an MCTF unit 210, a wavelet transforming unit 220, a quantization unit 230, an entropy coding unit 240 and a wavelet filter managing unit 250.

The MCTF unit 210 computes a motion vector from inputted Group of Pictures (GOP) and performs filtering with respect to the temporal axis by using the motion vector. The wavelet transforming unit 220 performs spatial wavelet transform on filtered frames.

The quantization unit 230 quantizes a wavelet coefficient which is obtained by performing the wavelet transform. The entropy coding unit 240 codes the motion vector and the quantized wavelet coefficient. The wavelet filter managing unit 250 selects proper filter lengths and decomposition levels of the wavelet transforming unit 220 based on the information amount of the filtered frames.

As described above, the MCTF unit 210 performs lowpass filtering and highpass filtering on the input GOP video by using the motion vector. The MCTF unit 210 generally uses a Haar filter and performs the lowpass filtering and highpass filtering until the number of lowpass-filtered frames is 1. In short, when the GOP is $2^N$, the MCTF unit 210 performs the lowpass filtering and highpass filtering as many times as $$\sum_{i=1}^{N} 2^{(N-1)}$$

Meanwhile, when MCTF is carried out, most video information comes to exist in the lowpass-filtered frames, and the amount of video information in the highpass-filtered frames goes in proportion to the extent of change of the frames.

In other words, when the frames are changed a little, most video information exists in the frames lowpass-filtered on the temporal axis, whereas the highpass-filtered frames have little video information. If the frames are changed a lot, much information exists in the highpass-filtered frames.

The frames with a small amount of information barely affect the compression efficiency of the coding apparatus, although the wavelet transforming unit 220 has a low decomposition capability. Therefore, even if a small decomposition level and a short filter length are used to perform wavelet transform, they hardly affect the compression efficiency of the video coding apparatus.

Therefore, the coding apparatus of the present invention adopts a wavelet filter managing unit 250 to select a proper filter length and a proper decomposition level for the wavelet transform unit 220 based on motion estimation information which is information on the change of frames during MCTF. The wavelet transforming unit 220 performs spatial wavelet transform based on the selected decomposition level and filter length.

Figure 3:
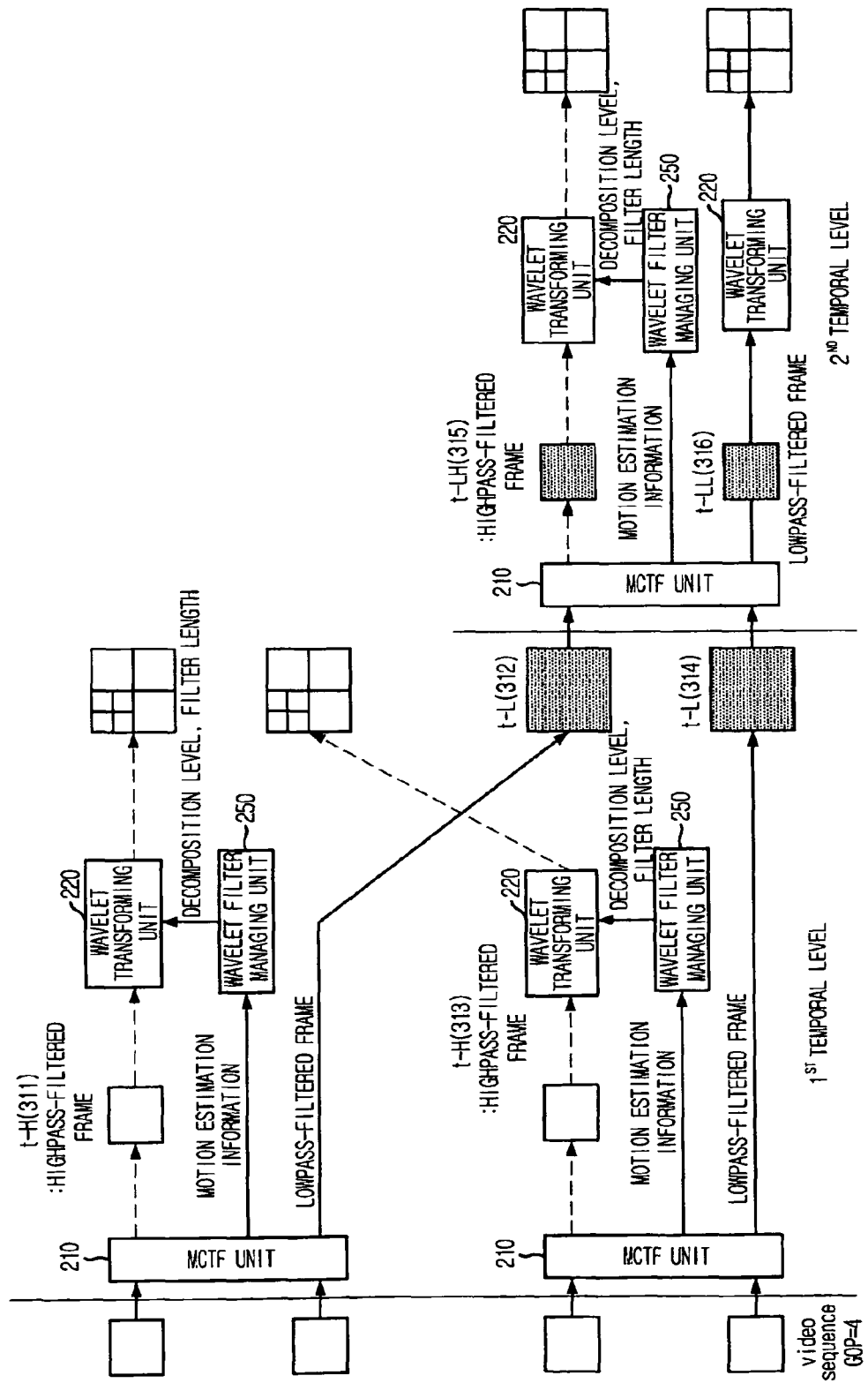
FIG. 3 is a diagram describing a coding process in the video coding apparatus of FIG. 2.

FIG. 3 is a diagram describing a coding process in the video coding apparatus of FIG. 2. For the sake of convenience in description, it is assumed that the GOP of the input frames is 4.

As shown, when the video frames are inputted the MCTF unit 210 performs sub-band filtering on the temporal axis. The filtering of the MCTF unit 210 is performed as described in FIG. 1.

The MCTF 210 generates two highpass-filtered t-H frames 311 and 313 and two lowpass-filtered t-L frames t-L frames 312 and 314 with respect to a first time level.

The wavelet filter managing unit 250 selects a proper length of a filter and a proper decomposition level for the wavelet transforming unit 220 to perform spatial wavelet transform on the highpass-filtered t-H frames 311 and 313 based on the motion estimation information obtained in the course of the MCTF process.

The MCTF unit 210 performs the spatial wavelet transform on the highpass-filtered t-H frames 311 and 313 by using the selected decomposition level and the filter length.

In the meantime, the MCTF unit 210 performs sub-band filtering again on the lowpass-filtered t-L frames 312 and 314 on the temporal axis and generates one highpass-filtered t-LH frame 315 and one lowpass-filtered t-LL frame 316 with respect to a second temporal level.

Also, the wavelet filter managing unit 250 selects a proper decomposition level and a proper filter length for the wavelet transforming unit 220 to perform wavelet transform on the highpass-filtered t-LH frame 315 based on motion estimation information obtained during the MCTF process. The wavelet transforming unit 220 performs spatial wavelet transform on the highpass-filtered t-LH frame 315 by using the selected decomposition level and the filter length.

The T-LL frame 316 lowpass-filtered finally is spatially wavelet-transformed by the wavelet transforming unit 220 having a maximum decomposition level and a maximum filter length.

Figure 4:
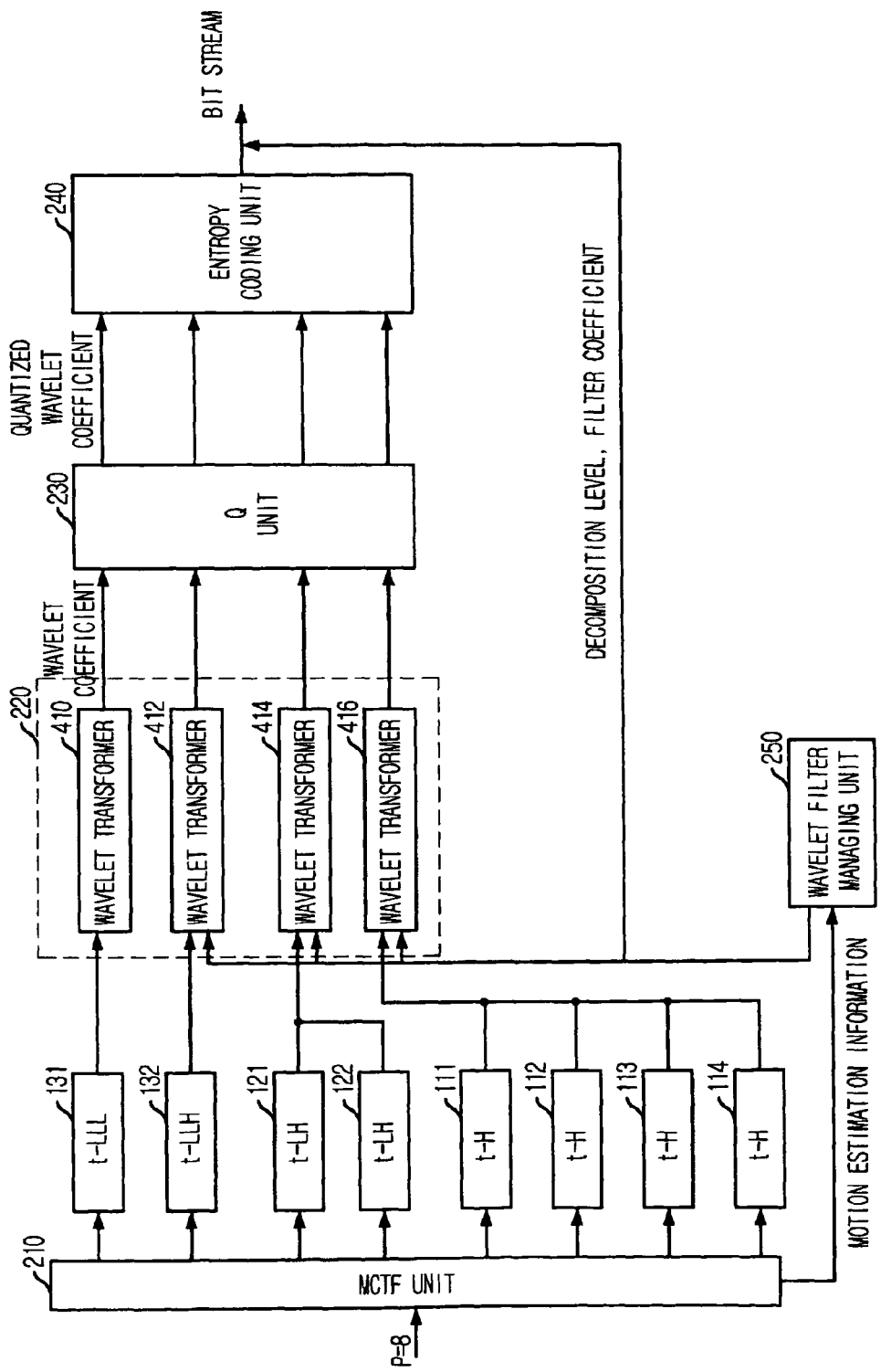
FIG. 4 is an exemplary view showing a video coding apparatus when a group of pictures (GOP) is 8 in accordance with the present invention.

FIG. 4 is an exemplary view showing a video coding apparatus when the GOP is 8 in accordance with the present invention. As shown, GOP video inputted by the MCTF unit 210 are filtered into t-H frames 111, 112, 113 and 114 of a first temporal level, t-LH frames 121 and 122 of a second temporal level, and a t-LLH frame 132 and a t-LLL frame 131 of a third temporal level.

Generally, since the t-LLL frame 131 has a large amount of information, the wavelet transform is performed by using a first wavelet transformer 410 having a maximum decomposition level and a maximum filter length. Desirably, the wavelet transformer 410 uses a 9/7 filter or a 5/3 filter that has a three or four-stage decomposition level.

The t-LLH frame 132 of a third temporal level is wavelet-transformed by a second wavelet transformer 412 and the t-LH frames 121 and 122 of the second temporal level is wavelet-transformed by a third wavelet transformer 414.

Also, the t-H frames 111, 112, 113 and 114 of the first temporal level are wavelet-transformed by a fourth wavelet transformer 416.

The wavelet filter managing unit 250 selects a decomposition level and a filter length for the wavelet transformers 412, 414 and 416 properly to the amount of information of each frame based on motion estimation information obtained through the MCTF process, and it controls the wavelet transforming unit 220. It is possible to select a decomposition level and a filter length that make the second through fourth wavelet transformers 412, 414 and 416 to be equal to or smaller than the first wavelet transformer 410.

The wavelet filter managing unit 250 can control the decomposition level and the filter length by considering the computing capability of a decoding apparatus so that the decoding apparatus could have an optimum computation amount. In particular, each of the wavelet transformers 412, 414 and 416 can use a Haar filter having a one-stage decomposition level to minimize the decoding computation of the decoding apparatus.

The wavelet filter managing unit 250, also, includes information on the selected decomposition level and the filter length in a coded bit stream and uses the information during inverse wavelet transform.

After the wavelet transform is completed wavelet transform coefficients of each temporal level are inputted to the quantization unit 105 and quantized. The quantized wavelet transform coefficients and motion vectors are inputted to the entropy coding unit 240 to thereby generate bit stream.

Figure 5:
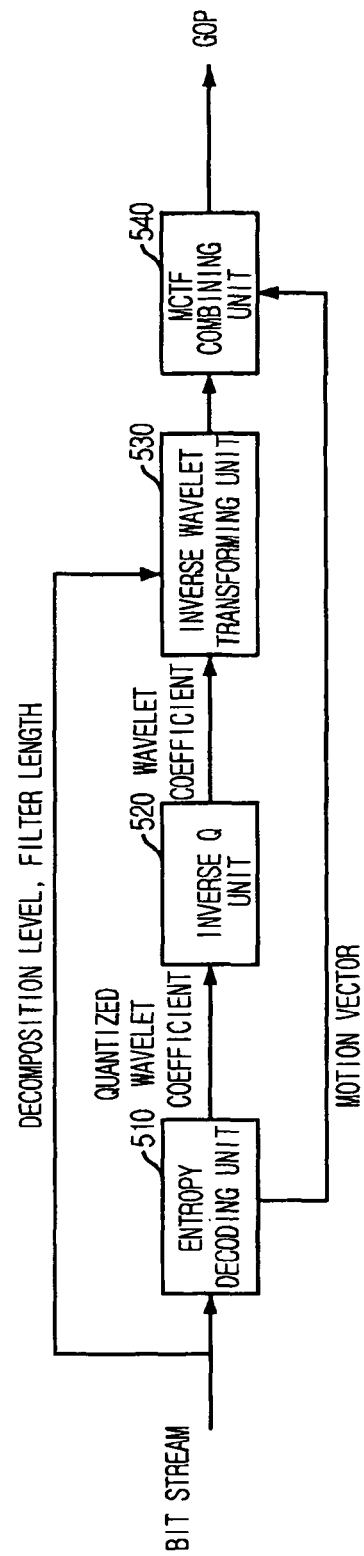
FIG. 5 is a block diagram illustrating a video decoding apparatus in accordance with the present invention.

FIG. 5 is a block diagram illustrating a video decoding apparatus in accordance with the present invention. As shown, the bit stream received in the decoding apparatus includes information on the decomposition level and filter length selected for a wavelet transformer in the coding step.

An entropy decoding unit 510 receives the bit stream, decodes it and outputs a quantized wavelet coefficient and a motion vector. The quantized wavelet coefficient is inputted to an inverse quantization unit 520 to be inverse-quantized.

The wavelet coefficient outputted from the inverse quantization unit 520 is inputted to an inverse wavelet transforming unit 530 along with the information on a decomposition level and a filter length which is included in the bit stream.

The inverse wavelet transforming unit 530 performs inverse wavelet transform on the inputted wavelet coefficient based on the decomposition level and filter length of a filter used for wavelet transform in the coding apparatus.

The MCTF combining unit 540 performs MCTF combination on the frames of each sub-band that are completed with the inverse wavelet transform by using the motion vector decoded in the entropy decoding unit 510.

The technology of the present invention can control the computation amount of inverse wavelet transform in the course of decoding process by adjusting the decomposition level and the filter length of a wavelet transform filter based on the amount of information of video coding process.

Therefore, it is possible to perform inter-frame wavelet decoding in a terminal having low computing capability such as a PDA by adjusting the decomposition level and filter length of a wavelet transform filter in consideration of the computing capability of a decoding apparatus.

While the present invention has been described with respect to certain preferred embodiments, it will be apparent to those skilled in the art that various changes and modifications may be made without departing from the scope of the invention as defined in the following claims.

The invention claimed is:

1. An inter-frame wavelet coding apparatus, comprising:
   a Motion Compensated Temporal Filtering (MCTF) unit for computing motion vectors of a group of pictures (GOP), and performing a lowpass filtering and a highpass filtering the GOP with respect to a first temporal axis using the motion vectors, in order to obtain a lowpass and a highpass filtered frames;
   wherein the MCTF unit performs the lowpass filtering and the highpass filtering on the lowpass filtered frame of the first temporal axis for at least one or more second temporal axis;
   a wavelet transforming unit for performing spatial wavelet transform on each of the highpass filtered frames and a final lowpass filtered frame and outputting wavelet coefficients of each temporal level for each of the highpass filtered frames and the final lowpass filtered frame;
   a quantization unit for quantizing the wavelet coefficients;
   an entropy coding unit for entropy-coding the motion vectors and the quantized wavelet coefficients, in order to generate an entropy-coded bit stream; and
   a wavelet filter managing unit for selecting a decomposition level and a filter length for the wavelet transforming unit based on motion estimation information of the GOP, which are obtained by performing the lowpass filtering and the highpass filtering the GOP in the MCTF unit;
   wherein the wavelet filter managing unit respectively selects the decomposition level and the filter length for each of the highpass filtered frames and the final lowpass filtered frame;
   wherein the decomposition level and the filter length for each of the highpass filtered frames are selected properly to the amount of information of each frame based on the motion estimation information;
   wherein the decomposition level and the filter length for the final lowpass filtered frame are selected a maximum decomposition level and a maximum filter length;
   wherein the decomposition level and the filter length are included in the entropy-coded bit stream.

2. The inter-frame wavelet coding apparatus as recited in claim 1, wherein the wavelet filter managing unit selects the decomposition level and the filter length based on a computing capability of a decoding apparatus to minimize a decoding computation of the decoding apparatus by having an optimum computation amount.

3. The inter-frame wavelet coding apparatus as recited in claim 1, wherein the wavelet transforming unit includes:
   a first wavelet transformer having the maximum decomposition level and the maximum filter length, and wavelet-transforming the final lowpass-filtered frame; and
   a second wavelet transformer having a decomposition level and a filter length equal to or smaller than the decomposition level and the filter length of the first wavelet transformer, and wavelet-transforming each of the highpass filtered frames.

4. The inter-frame wavelet coding apparatus as recited in claim 3, wherein the wavelet filter managing unit selects a 9/7 filter having a three or four-stage decomposition level as the first wavelet transformer.

5. The inter-frame wavelet coding apparatus as recited in claim 3, wherein the wavelet filter managing unit selects a 5/3 filter having a three or four-stage decomposition level as the first wavelet transformer.

6. The inter-frame wavelet coding apparatus as recited in claim 3, wherein the wavelet filter managing unit selects a Haar filter having one-stage decomposition level as the second wavelet transformer.

7. An inter-frame wavelet encoding apparatus, comprising:
a Motion Compensated Temporal Filtering (MCTF) unit for computing motion vectors of a group of pictures (GOP), and repeatedly performing a lowpass filtering and a highpass filtering the GOP with respect to a first temporal axis using the motion vectors, in order to obtain a lowpass and a highpass filtered frames;
wherein the MCTF unit performs lowpass filtering and highpass filtering on the lowpass filtered frame of the first temporal axis for at least one or more second temporal axis;
a first wavelet transformer having a maximum decomposition level and a maximum filter length, and wavelet-transforming a final lowpass-filtered frame;
a second wavelet transformer for each of the highpass filtered GOP frames
a second wavelet transformer having a decomposition level and a filter length equal to or smaller than the decomposition level and the filter length of the first wavelet transformer, and wavelet-transforming each of the highpass filtered frames;
a quantization unit for quantizing wavelet coefficients of each temporal level for each of the highpass filtered frames and the final lowpass filtered frame; and
wherein the wavelet coefficients are outputted from the first and second wavelet transformer by the wavelet-transforming; an entropy coding unit for entropy-coding the motion vectors and the quantized wavelet coefficients;
wherein the decomposition level and the filter length of the first and second wavelet transformer are controlled based on motion estimation information of the GOP, which are obtained by performing the lowpass filtering and the highpass filtering the GOP in the MCTF unit;
wherein the decomposition level and the filter length of the second wavelet transformer for each of the highpass filtered frames are controlled properly to the amount of information of each frame based on the motion estimation information;
wherein the decomposition level and the filter length of the first wavelet transformer for the final lowpass filtered frame are controlled the maximum decomposition level and the maximum filter length.

8. The inter-frame wavelet coding apparatus as recited in claim 7, wherein the first wavelet transformer includes a 9/7 filter having a three or four-stage decomposition level.

9. The inter-frame wavelet coding apparatus as recited in claim 8, wherein the first wavelet transformer includes a 5/3 filter having a three or four-stage decomposition level.

10. The inter-frame wavelet coding apparatus as recited in claim 8, wherein the second wavelet transformer includes a Haar filter having a one-stage decomposition level.

11. An inter-frame wavelet video decoding apparatus, comprising:
an entropy decoding unit for entropy-decoding bit stream including information on a decomposition level and a filter length for inverse wavelet transform;
an inverse quantization unit for inverse quantizing quantized wavelet coefficients which is outputted from the entropy decoding unit;
an inverse wavelet transforming unit for performing wavelet transform on the wavelet coefficients outputted from the inverse quantization unit based on the decomposition level and the filter length; and
a Motion Compensated Temporal Filtering (MCTF) combining unit for performing MCTF combination on motion vectors of the entropy decoding unit, and outputting a group of pictures (GOP);
wherein the GOP is performed a lowpass filtering and a highpass filtering with respect to a first temporal axis using the motion vectors based on the MCTF, in order to obtain a lowpass and a highpass filtered frames;
wherein the GOP is performed the lowpass filtering and the highpass filtering on the lowpass filtered frame of the first temporal axis for at least one or more second temporal axis
wherein the decomposition level and the filter length for each of highpass filtered frames and a final lowpass filtered frame are respectively controlled based on motion estimation information of the GOP;
wherein the decomposition level and the filter length for each of the highpass filtered frames are controlled properly to the amount of information of each frame based on the motion estimation information;
wherein the decomposition level and the filter length for the final lowpass filtered frame are controlled a maximum decomposition level and a maximum filter length.

12. An inter-frame wavelet coding method, comprising the steps of:
a) computing motion vectors of a group of pictures (GOP), and performing Motion Compensated Temporal Filtering (MCTF) the GOP;
wherein the MCTF performs a lowpass filtering and a highpass filtering the GOP with respect to a first temporal axis using the motion vectors, in order to obtain a lowpass and a highpass filtered frames;
wherein the MCTF performs the lowpass filtering and the highpass filtering on the lowpass filtered frame of the first temporal axis for at least one or more second temporal axis;
b) performing spatial wavelet transform on each of the highpass filtered frames and a final lowpass filtered frame, and outputting wavelet coefficients of each temporal level for each of the highpass filtered frames and the final lowpass filtered frame;
c) quantizing the wavelet coefficients;
d) performing entropy-encoding on the motion vectors and the quantized wavelet coefficients, in order to generate an entropy-coded bit stream;
e) selecting a decomposition level and a filter length for the spatial wavelet transform based on motion estimation information of the GOP obtained by computed the MCTF; and
f) including information on the decomposition level and the filter length in the entropy-coded bit stream;
wherein the step e) respectively selects the decomposition level and the filter length for each of the highpass filtered frames and the final lowpass filtered frame;
wherein the decomposition level and the filter length for each of the highpass filtered frames are selected properly to the amount of information of each frame based on the motion estimation information;

wherein the decomposition level and the filter length for the final lowpass filtered frame are selected a maximum decomposition level and a maximum filter length.

13. The inter-frame wavelet coding method as recited in claim 12, wherein
the step e) selects the decomposition level and the filter length based on a computing capability of a decoding apparatus to minimize a decoding computation of the decoding apparatus by having an optimum computation amount.

14. The inter-frame wavelet coding method as recited in claim 12, wherein the step b) includes the steps of:
   b1) performing wavelet transform on the final lowpass-filtered frame by using a first wavelet transformer which has the maximum decomposition level and the maximum filter length; and
   b2) performing wavelet transform on each of the highpass filtered frames by using a second wavelet transformer, which has decomposition level and a filter length equal to or smaller than the decomposition level and the filter length of the first wavelet transformer.

15. The inter-frame wavelet coding method as recited in claim 14, wherein in the step e) a 9/7 filter having a three or four-stage decomposition level is selected as the first wavelet transformer.

16. The inter-frame wavelet coding method as recited in claim 14, wherein in the step e) a 5/3 filter having a three or four-stage decomposition level is selected as the first wavelet transformer.

17. The inter-frame wavelet coding method as recited in claim 14, wherein in the step e) a Haar filter having a one-stage decomposition level is selected as the second wavelet transformer.

18. An inter-frame wavelet decoding method, comprising the steps of:
   a) performing entropy-decoding on bit stream including information on a decomposition level and a filter length for inverse wavelet transform;
   b) inverse-quantizing quantized wavelet coefficients generated in the step a);
   c) performing inverse wavelet transform on wavelet coefficients generated in the step b) based on the information on the decomposition level and the filter length; and
   d) performing a Motion Compensated Temporal Filtering (MCTF) combination based on motion vectors obtained in the step a), and outputting a group of pictures (GOP);
   wherein the GOP is performed a lowpass filtering and a highpass filtering with respect to a first temporal axis using the motion vectors based on the MCTF, in order to obtain a lowpass and a highpass filtered frames;
   wherein the GOP is performed the lowpass filtering and the highpass filtering on the lowpass filtered frame of the first temporal axis for at least one or more second temporal axis
   wherein the decomposition level and the filter length for each of highpass filtered frames and a final lowpass filtered frame are respectively controlled based on motion estimation information of the GOP;
   wherein the decomposition level and the filter length for each of the highpass filtered frames are controlled properly to the amount of information of each frame based on the motion estimation information;
   wherein the decomposition level and the filter length for the final lowpass filtered frame are controlled a maximum decomposition level and a maximum filter length.

* * * * *